Nov. 20, 1923.
F. F. W. SCHILDENER
1,474,945
DEVICE FOR TREATING CHOCOLATE MASSES OR OTHER MATERIALS
Filed Aug. 8, 1921
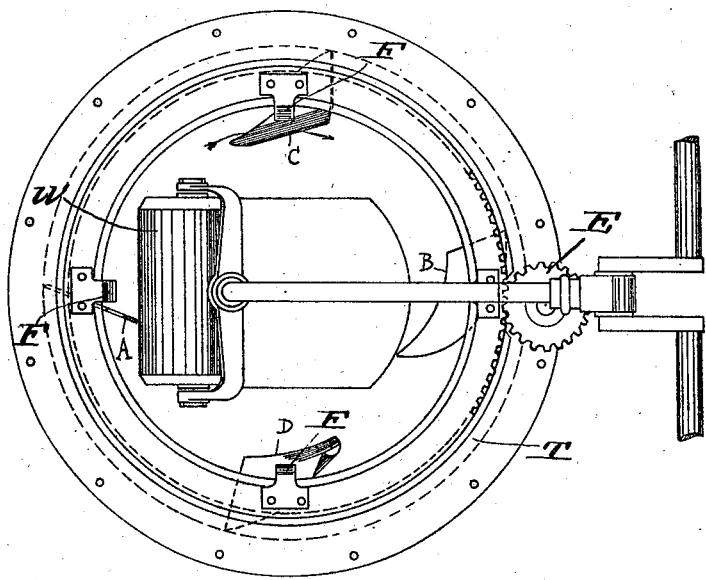
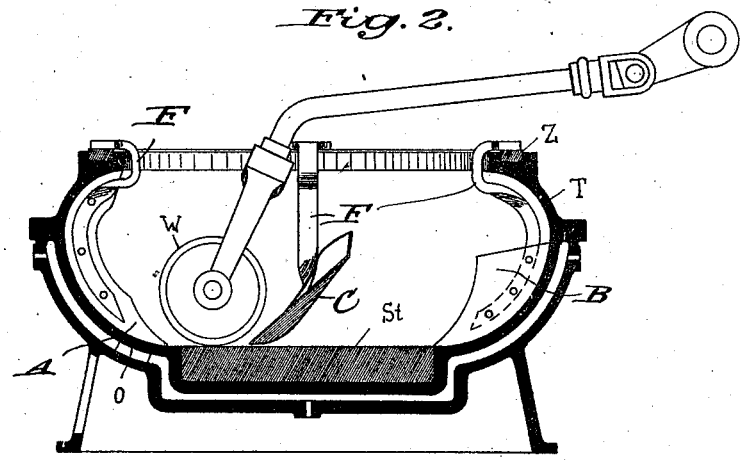
INVENTOR
F. F. W. Schildener,
By C. P. Goepel
Attorney.

Patented Nov. 20, 1923.

1,474,945

UNITED STATES PATENT OFFICE.

FRIEDRICH FRANZ WILHELM SCHILDENER, OF ZSCHIEREN, NEAR DRESDEN, GERMANY.

DEVICE FOR TREATING CHOCOLATE MASSES OR OTHER MATERIALS.

Application filed August 8, 1921. Serial No. 490,767.

*To all whom it may concern:*

Be it known that I, FRIEDRICH FRANZ WILHELM SCHILDENER, residing at Zschieren, near Dresden, in the Republic of Saxony, Germany, have invented certain new and useful Improvements in Devices for Treating Chocolate Masses or Other Materials (for which I have filed applications in Germany, under Sch. 56,983 X/53 1, dated 13th of December, 1919; Great Britain, under Nr. 10,874, dated 14th of April, 1921; Switzerland, under Nr. 11,970, dated 29th of March, 1921), of which the following is a specification.

This invention relates to a device for treating chocolate masses or other materials by means of mixing and kneading elements moving about in a heated container provided with a discharging outlet.

The invention consists more particularly in the combination of the mixing and kneading elements with other elements circulating around the former and turning the material over, this combination being effected in such a manner that the mass moving to and fro is pushed with every movement into the circulating mass, and that inversely the circulating mass is pushed into the mass moving to and fro. This is always effected at other continuously changing points of the container and parts of the mass, the latter being continuously propelled and turned over by the circulating members, e. g. the reversing blades. Such mixers and scrapers are used, e. g. in crushing mills and rotary grinding mills, as is well known to those skilled in the art, and in these the mixing elements move on cycloidal lines or rotate in the manner of a gyroscope. Up till now, however, these movements were not performed in combination with a mixing and kneading body describing a reciprocating movement in the container.

In the drawing affixed to this specification and forming part thereof—

Fig. 1 is a plan view of an agitating device constructed according to the present invention.

Fig. 2 is a vertical section taken substantially centrally through the same.

The untreated, raw chocolate mass is placed in a heated circular container T, in which it is continuously moved to and fro, similar to the mass in a longitudinal grinding mill, by means of a rolling cylinder or similar member W. In order to subject all and any parts of the mass to the treatment, a number of mixing and scraping blades A, B, C and D rotate around the inner wall of the container T and about the roller W. The blades A, B, C and D are connected to a toothed ring Z mounted to slide on the upper edge of the container. The ring Z may be turned by a main driving gear E, and the blades A, B, C and D are secured to arms F which extend down into the container and carry the blades in the direction of the arrow, Fig. 1. The mixing blades B, C and D recede inwardly from the wall of the container and push the mass, not touched by the roller, towards the same by deflecting the mass toward the center of the container, the roller continuously forcing the mass before it into the path of the mixing blades, so that the process is continuously repeated. The blade A is in the form of a scraper travelling at the same time along the inner wall of the container and scrapes the mass from the inner wall, thereby preventing the mass from being burnt and insuring that it be mixed again with the body of the mass.

By thus advantageously combining the action of the reciprocating and rotating elements, or means for agitating the chocolate mass, the latter is continuously kept in motion, spread out and compressed again, pushed one part into the other, turned over and thoroughly mixed and kneaded. The mass lying at the bottom near the inner face of the side wall of the container is lifted up and turned over by the mixing blade B in its clockwise movement in a similar manner as the ground is broken and laid over by the share of a plough, whilst the blade C acts in a reverse manner, pressing the mass downward again, this blade being high at its forward and low at its rear end. The blade D abuts with its edge against the side wall of the container and, with its rear concave end, juts out towards the center of the container in a slanting position, so that the blade in its clockwise movement pushes the mass from the circumference towards the center of the container, where the mass is subjected again to the action of the roller, and thus the process of treatment is in a continuous cycle. The finished chocolate mass may be automatically discharged through the outlet O in the bottom of the container.

I claim:—

1. In a device for treating chocolate masses and the like, a container adapted to receive the mass, a reciprocating member mounted for travel in a rectilinear direction for agitating the mass, and means arranged within the container and movable relatively thereto for travel in a circular path to direct the mass centrally from the wall of the container into the path of the reciprocating member.

2. In a device for treating chocolate masses or other materials, a stationary container adapted to receive the mass, a reciprocating member mounted to travel in a right line path through the mass in the container to agitate the mass, and laterally disposed means in the container for movement in the mass, to direct the same into the path of said reciprocating member.

3. In a device for treating chocolate masses and other materials, a container adapted to receive the mass, a roller mounted for reciprocating in a right line path in the container for agitating the mass, and means mounted to travel in a path extending along the inner wall of the container for operation about said reciprocating member to deflect the mass from the walls of the container back into the path of the roller.

4. In a device for treating chocolate and other masses, a stationary container adapted to receive the mass, a reciprocating roller mounted in the container for travel in a right line to move the mass, and circularly travelling agitators mounted in the container for operation about the roller to deflect the mass displaced by the movement of the roller back into the path of the roller.

5. In a device for treating chocolate and other masses, a container adapted to receive the mass, a roller mounted to reciprocate in a right line and diametrically of and in the container for agitating the mass, and a plurality of circularly travelling agitators mounted in the container for operation over the inner wall of the container and about the roller for deflecting the mass inwardly into the path of the roller in various directional streams and for removing accumulations of the mass from the inner wall of the container to prevent sticking of the same and insure the thorough admixing of the mass.

In testimony whereof I affix my signature in presence of two witnesses.

FRIEDRICH FRANZ WILHELM SCHILDENER.

Witnesses:
OTTO HOEN,
JOHANNA SCHAFER.